(12) United States Patent
Virgili et al.

(10) Patent No.: US 11,078,319 B2
(45) Date of Patent: Aug. 3, 2021

(54) METHOD FOR FORMING A CAST ELASTOMER

(71) Applicant: Tactus Technology, Inc., Fremont, CA (US)

(72) Inventors: Justin Virgili, Fremont, CA (US); Curtis Takagi, Fremont, CA (US)

(73) Assignee: Tactus Technology, Inc., Fremont, CA (US)

( * ) Notice: Subject to any disclaimer, the term of this patent is extended or adjusted under 35 U.S.C. 154(b) by 111 days.

(21) Appl. No.: 15/895,971

(22) Filed: Feb. 13, 2018

(65) Prior Publication Data

US 2018/0230258 A1   Aug. 16, 2018

Related U.S. Application Data

(60) Provisional application No. 62/458,458, filed on Feb. 13, 2017.

(51) Int. Cl.

| | |
|---|---|
| *C08G 18/10* | (2006.01) |
| *C08G 18/34* | (2006.01) |
| *C08G 18/76* | (2006.01) |
| *C08G 18/24* | (2006.01) |
| *C08K 5/053* | (2006.01) |
| *B05D 3/12* | (2006.01) |
| *B05D 7/04* | (2006.01) |
| *B05D 7/24* | (2006.01) |
| *G06F 3/01* | (2006.01) |
| *B05D 1/26* | (2006.01) |
| *C09D 175/04* | (2006.01) |
| *C08G 18/32* | (2006.01) |
| *G06F 3/041* | (2006.01) |
| *C08G 18/42* | (2006.01) |
| *B05D 1/36* | (2006.01) |
| *B05D 3/02* | (2006.01) |
| *B05D 7/00* | (2006.01) |

(52) U.S. Cl.
CPC ............. *C08G 18/10* (2013.01); *B05D 1/265* (2013.01); *B05D 3/12* (2013.01); *B05D 7/04* (2013.01); *B05D 7/24* (2013.01); *C08G 18/246* (2013.01); *C08G 18/3206* (2013.01); *C08G 18/3237* (2013.01); *C08G 18/34* (2013.01); *C08G 18/42* (2013.01); *C08G 18/7621* (2013.01); *C08K 5/053* (2013.01); *C09D 175/04* (2013.01); *G06F 3/016* (2013.01); *G06F 3/041* (2013.01); *B05D 1/36* (2013.01); *B05D 3/0272* (2013.01); *B05D 7/542* (2013.01); *B05D 2201/02* (2013.01); *B05D 2252/02* (2013.01); *B05D 2252/04* (2013.01); *B05D 2508/00* (2013.01); *G06F 2203/04103* (2013.01)

(58) Field of Classification Search
CPC ................ C08G 18/10; C08G 18/3237; C08G 18/3206; C08G 18/42; C08G 18/34; C08G 18/7621; C08G 18/246; C09D 175/04; C08K 5/053; B05D 3/12; B05D 7/04; B05D 7/24; B05D 1/265; B05D 1/36; B05D 3/0272; B05D 2252/04; B05D 7/542; B05D 2252/02; B05D 2508/00; B05D 2201/02; G06F 3/016; G06F 2203/04103; G06F 3/041

See application file for complete search history.

(56) References Cited

U.S. PATENT DOCUMENTS

| | | |
|---|---|---|
| 6,733,834 B1 | 5/2004 | Bellmann et al. |
| 2005/0123684 A1* | 6/2005 | Makowski ......... C08G 18/0823 427/384 |
| 2012/0240384 A1 | 9/2012 | Priante |
| 2014/0008115 A1 | 1/2014 | Sato et al. |
| 2014/0128543 A1* | 5/2014 | Clinnin .................. C08G 18/73 524/871 |
| 2014/0290855 A1 | 10/2014 | Ristoski et al. |
| 2015/0242020 A1 | 8/2015 | Yairi et al. |
| 2015/0321908 A1* | 11/2015 | Wagner ....................... C08J 5/18 428/423.1 |

\* cited by examiner

*Primary Examiner* — Rabon A Sergent
(74) *Attorney, Agent, or Firm* — Run8 Patent Group LLC; Peter Miller; Alexander R. Flake

(57) ABSTRACT

One variation of a method for directly casting a thin layer onto a substrate includes: combining a prepolymer, a solvent, and a curing agent to define a viscous material; advancing a substrate from a roll across a surface continuously at a first speed; depositing the viscous material at a viscosity through a deposition head onto the substrate, the viscous material flowing laterally across the substrate to form a thin layer of substantially uniform thickness over the substrate over a period of time while the substrate advances along the surface; and, at a distance from the deposition head depositing the viscous material onto the substrate corresponding to a duration of time for the viscous material to flow laterally across the substrate, heating the viscous material to evaporate solvent and to induce reaction between the curing agent and the prepolymer to cure the viscous material to form a layer.

18 Claims, 4 Drawing Sheets

METHOD FOR FORMING A CAST ELASTOMER

CROSS-REFERENCE TO RELATED APPLICATIONS

This Application claims the benefit of U.S. Provisional Application No. 62/458,458, filed on 13 Feb. 2017, which is incorporated in its entirety by this reference.

TECHNICAL FIELD

This invention relates generally to the field of touch-sensitive surfaces, and more specifically to a composition of the touch-sensitive surface and a method for producing the touch-sensitive surface in the field of touch-sensitive surfaces.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
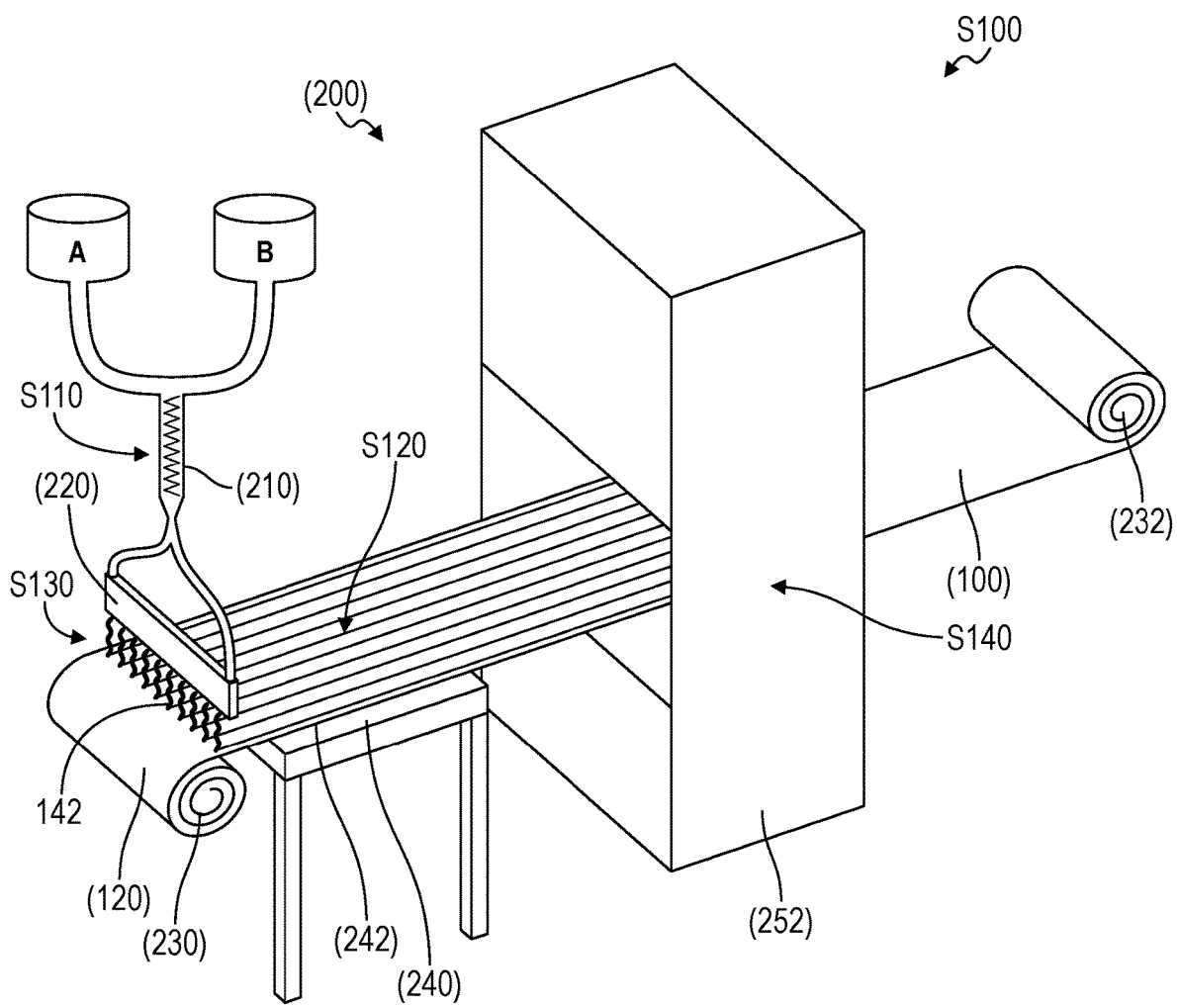
FIG. 1 is a flowchart representation of a method.
Figure 2:
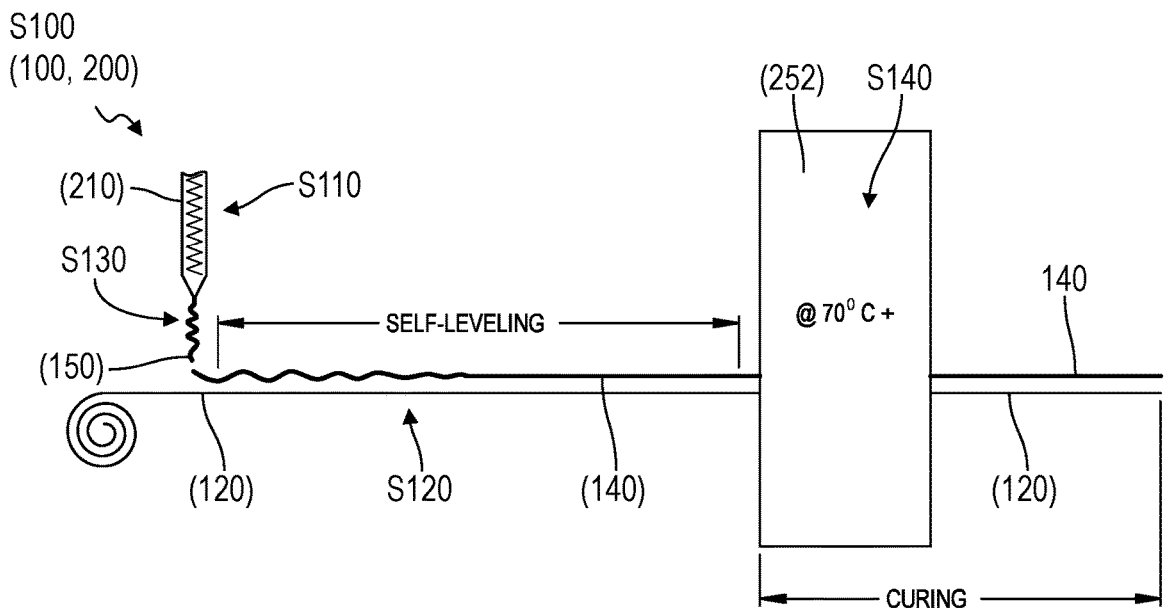
FIG. 2 is a flowchart representation of a variation of the method.

As shown in FIGS. 1 and 2, a method S100 for directly casting a thin elastomer layer includes: combining a prepolymer 151, a solvent 152, a cross-linking agent, and a chain extender to define a viscous material 150 in Block S110; advancing a substrate from a first roll 230 across a surface continuously at a first speed in Block S120; depositing the first viscous material 150 through a deposition head at a first viscosity onto the substrate 120 in Block S130, the first viscous material 150 flowing laterally across the substrate 120 to form a thin layer of substantially uniform thickness over the substrate over a period of time while the substrate advances along the surface; at a distance from the deposition head of the first viscous material 150 onto the substrate 120 corresponding to a duration of time for the first viscous material 150 to flow laterally across the substrate to form the thin layer, heating the thin layer 140 to evaporate solvent 152 from the thin layer and to induce reaction between the prepolymer 151, the cross-linking agent 154, and the chain extender 153 to cure the thin layer 140 in Block S140.

Figure 3:
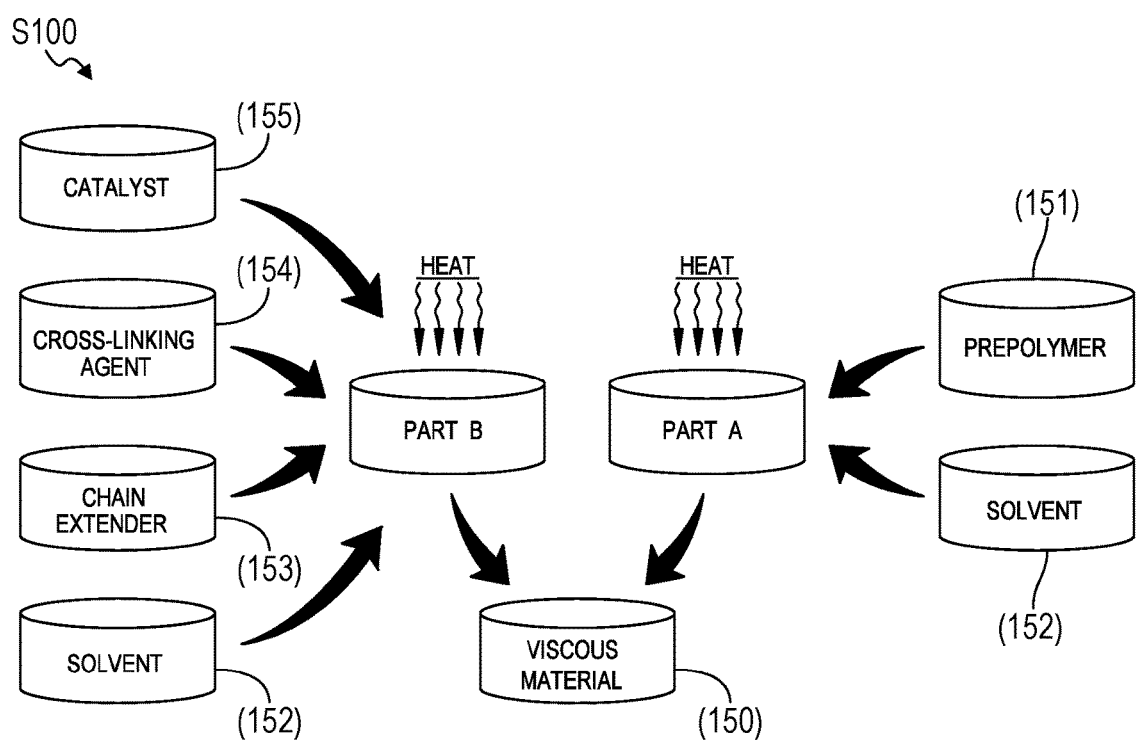
FIG. 3 is a flowchart representation of a variation of the method.

One variation shown in FIG. 1 and FIG. 3 of the method S100 includes: mixing a first solution and a second solution to define a viscous material 150, the first solution including the prepolymer 151 and the solvent 152, the second solution including a catalyst 155, a cross-linking agent 154, and a polymer chain extender 153; advancing a substrate from a first roll 230 across a surface at continuously a first speed in Block S120; depositing the first viscous material 150 through a deposition head at a first viscosity onto the substrate 120 in Block S130, the first viscous material 150 flowing laterally across the substrate 120 to form a thin layer of substantially uniform thickness over the substrate over a period of time while the substrate advances along the surface; at a distance from the deposition head of the first viscous material 150 onto the substrate 120 corresponding to a duration of time for the viscous material 150 to flow laterally across the substrate to form the thin layer, heating the thin layer 140 to remove solvent 152 from the thin layer and to induce reaction between the prepolymer 151, the cross-linking agent, and the chain extender to cure the thin layer 140 in Block S140 including physically and chemically cross-linked polymer chains.

2. Applications

Generally, Blocks of the method S100 can be implemented in a continuous roll-to-roll process that produces a thin layer 140 that exhibits both chemical and physical cross-linking to yield clear optical properties and particular mechanical properties, such as resistance to impact, pencil hardness, etc.

In particular, a system 200 including a mixing head 210, a slot-die coater 220, a conveying system 242, and an oven 252 can mix a prepolymer 151 with solvent 152 to form a viscous material 150. The prepolymer 151 can be a monomer that has been reacted to an intermediate molecular mass state and is capable of polymerizing to a fully-cured high-molecular weight state, such as a toluene diisocyanate terminated polyester prepolymer 151. The system can add the solvent 152 (e.g., methyl ethyl ketone or "MEK") to dissolve the prepolymer 151 (e.g., in a batch process distinct from a coating process described below). The system 200 can then combine the prepolymer-solvent combination with catalyst 155 (e.g., dibutyltin dilaurate), polymer chain extender 153 (e.g., aromatic diamine curative for polyurethane), cross-linking agent 154 (e.g., ditrimethylolpropane or "DiTMP"), and/or more solvent 152 within a mixing head 210 to form a viscous material 150 (e.g., a mixture). While the system continuously progresses (or translates) a substrate, such as extruded urethane or polyethylene terephthalate, from a first roll 230 across a surface and under a deposition head, the system 200 can distribute the viscous material 150 through a deposition head (e.g., a slot-die coater 220) onto the substrate 120. Upon deposition onto the substrate 120, the viscous material 150 can distribute laterally across the substrate 120 until the viscous material 150 self-levels forming a thin layer 140 of substantially uniform thickness across the substrate 120 as the system 200 conveys the substrate 120 and layer of viscous material 150 across a smooth surface (e.g., a mirror-finish plate) toward an oven 252. The system 200 can tune a distance between deposition of the viscous material 150 onto the substrate 120 and entry into the oven 252, such that the thin layer 140 of viscous material 150 partially cures and polymerizes prior to entry into the oven 252. The system 200 can then move the substrate 120 and thin layer 140 through the oven 252, which can heat the thin layer 140 to drive off the solvent 152 and induce further polymerization and curing of the thin layer 140. Within the oven 252, the system can control curing to induce chemical and physical cross-linking of polymers within the thin layer 140 and between the thin layer 140 and the substrate 120 to form a tactile layer 100. After exiting the oven, the system 200 can spool the tactile layer 100—prior to or after the tactile layer 100 has fully cured—onto a roll, which can then be segmented for assembly into touch-sensitive surfaces and/or other applications.

In one implementation, the system 200 can execute Blocks of the method to cast urethane prepolymer (or monomer) in order to promote polymerization and physical and chemical cross-linking of polymer chains. Rather than melting and casting (or extruding) a polymer with chemical and physical cross-links formed prior to casting, the system 200 can cast prepolymer 151 to improve physical cross-links between polymer chains (and the overall tactile layer 100) after casting and, thereby improve mechanical properties (e.g., durability) of the tactile layer 100 after casting.

Additionally or alternatively, by implementing a roll-to-roll direct casting process for manufacturing elastomeric films, the system 200 can reduce cycle time and improve quality-control for manufacturing high-durability elastomeric films with high optical clarity for integration into touch-sensitive surfaces (e.g., over a display 170). Generally, elastomer films are directly cast onto a discrete, pre-cut substrate 120. However, in one implementation, the system 200 can directly and continuously cast a tactile layer 100 onto a continuous substrate 120 (rather than forming a discrete substrate 120 pre-shaped for its application into a mobile computing device and casting polymer onto the discrete substrate 120).

Furthermore, the system 200 can optimize pot time of the tactile layer 100 such that the thin layer 140 can set and cure offline (i.e., on the roll) rather than waiting for the elastomer later to fully cure on the manufacturing line. As described below, the viscous material 150 that forms the thin layer 140 can include an abbreviated pot life (or working time) of the viscous material 150 that forms the thin layer 140 that is typically insufficient to produce an adequate thick film on a conventional commercial line. However, the system 200 can implement the method S100 to accommodate the abbreviated pot life (e.g., one to twelve minutes) and leverage the abbreviated pot life to enable off-line curing of the thin layer 140. By optimizing pot life, the system 200 can advance curing of the thin layer 140 to sufficiently cure the elastomer prior to spooling while limiting risk of inducing a defect, such as a scratch or other aberrancy, during the spooling process. Therefore, the system 200 can implement Blocks of the method S100 to improve manufacturing efficiency and cycle time during mass production of the tactile layer 100.

The system 200 can also implement Blocks of the method to control process parameters, such as cure time, conveyance speed, oven temperature, etc., to tune optical and mechanical material properties of the tactile layer 100 for repeated use, resistance to impacts, malleability, optical clarity, and/or transmittance of light across the tactile layer 100 (e.g., optical clarity). In one implementation, the system 200 can tune a distance (and/or duration) between deposition of the polymer-solvent 152 viscous material 150 onto the substrate 120 and curing of the layer in the oven 252 to control pot life of the thin layer 140 and, thereby, control a rate and extent to which polymers of the thin layer 140 cross-link. Existing materials, such as a polyethylene terephthalate (PET) with a barrier film, such as a SiOx coating, can exhibit optical clarity. However, such materials can also exhibit poor durability and malleability. For example, a PET material can stretch approximately three percent (3%). Accordingly, the existing materials often lack desirable elasticity in combination with desired optical clarity. Other existing materials, such as silicone, can also exhibit desirable optical clarity but lack scratch or abrasion resistance for desired applications.

While the method described herein is directed toward manufacturing of a urethane elastomer layer, such as integrated in a touch sensitive surface, the method can also be implemented to manufacture elastomer and/or non-elastomeric layers for any other application. Furthermore, the method S100 can process and cast any other composition of material to generate the thin layer 140.

3. Mixing Prepolymer

Block S110 of the method S100 recites combining a prepolymer 151, a solvent 152, and a catalyst 155 to define a viscous material 150. Generally, the system 200 can dissolve one or more base components of the thin layer 140 (e.g., urethane prepolymer 151) with solvent 152 (e.g., MEK) in Block Silo to form a viscous material 150 (i.e., a liquid) of a particular viscosity configured to allow the viscous material 150 to flow across and self-level on the substrate 120 within a prescribed period.

In one implementation, the system 200 can mix the prepolymer 151, the solvent 152, and the catalyst 155 within a mixing vessel and/or mixing head 210. As described below, the system 200 can mix a TDI-terminated polyester prepolymer 151 and a solvent 152, such as methyl ethyl ketone or cyclohexanone, to form a liquid viscous material 150. Additionally or alternatively, the system 200 can heat the viscous material 150 to dissolve the prepolymer 151. (The TDI-terminated polyester prepolymer 151 can form a solid at ambient temperatures). The system 200 can heat the prepolymer 151 further and/or dilute the prepolymer 151 with MEK and/or cyclohexanone to form the liquid viscous material 150 of a viscosity (e.g., less than 3500 centipoise or "cP") desired for distribution through a slot-die as described below. In particular, the system 200 can heat the prepolymer 151 to a temperature at which the polymer and solvent are soluble (e.g., between seventy and a hundred degrees Celsius). In this implementation, the system 200 can also define the viscous material 150 to exhibit a viscosity such that, after distribution of the viscous material 150 onto the substrate 120, the viscous material 150 flows across the substrate 120 at a rate sufficient to facilitate self-leveling within a period of time and to limit formation of flow lines (i.e., lines that appear in the thin layer 140 after curing and indicate direction of flow of the viscous material 150 across the substrate 120).

Similarly, the system 200 can also mix curing agents, such as catalysts (e.g., dibutyltin dilaurate), chain extenders, and/or cross-linking agents with a solvent 152 within a mixing vessel and/or mixing head 210. In one implementation, the system 200 can heat the curing agent-solvent 152 combination to facilitate dissolution of the curing agents. For example, a chain extender 153 aromatic diamine curative for polyurethane can remain a liquid at room temperature (e.g., 25 degrees Celsius) while a cross-linking agent 154 DiTMP remains a solid at room temperature. Therefore, the system 200 can heat the aromatic diamine curative for polyurethane and DiTMP and combine with solvent 152 (e.g., MEK) to a temperature at which DiTMP is soluble (e.g., greater than sixty degrees Celsius). As described below, the system 200 (and/or operators of the system 200) can select the catalyst 155, the cross-linking agent 154, and/or the chain extender 153 to define a particular cure time, a particular percentage or rate of cross-linking of polymer chains, etc. Therefore, the system 200 can select and mix catalysts, cross-linking agents, and/or chain extenders to generate a substantially transparent thin layer 140 exhibiting a particular yield strength, durometer, relaxation time, and/or other mechanical property.

The system 200 can combine any combination of prepolymer 151, solvent 152, and/or curing agent (i.e., catalyst 155, cross-linking agent 154, and/or chain-extender). As described below, the system 200 can combine components of the thin layer 140 to define a viscous material 150 within the mixing head 210 including—by weight percentage of the viscous material 150 as a whole—between sixty and ninety percent prepolymer 151; between two and four percent chain extender 153; between one and three percent cross-linking agent 154; between zero and 0.5 percent catalyst 155; and between five and thirty-five percent solvent 152.

In another implementation shown in FIG. 1 and FIG. 3, the system 200 can mix a prepolymer 151 and solvent 152 to form "Part A" and mix curing-agents to form "Part B", independently. The system can then combine Part A and Part B within a mixing head 210. In this implementation, the system 200 can heat and/or add additional solvent 152 to the viscous material 150 of Part A and Part B. For example, the system 200 can define a maximum allowable viscosity of combined components of the viscous material 150. Due to a difference in viscosities of Part A and Part B, the system 200 can heat and/or add additional solvent 152 to equilibrate viscosities of the (final) and define a viscous material 150 with a viscosity remaining below a maximum allowable viscosity suitable for distribution through a slot-die coater 220. In particular, the system 200 can measure viscosities of Part A and Part B and, in response to a viscosity of one of Part A and/or Part B exceeding a threshold viscosity, heat and/or add solvent 152 to the appropriate viscous material 150.

Additionally or alternatively, to encourage mixing of components (i.e., Part A and Part B), the system 200 can define a threshold (acceptable) deviation between viscosities of components of the viscous material 150. For example, the system 200 can define a threshold deviation of viscosities of the components at twenty-percent deviation, such that the viscosity of Part A remains within twenty percent of the viscosity of Part B.

Once Part A and Part B are suitably mixed individually and/or dissolve, the system 200 can combine Part A and Part B within a mixing head 210. For example, the system 200 can store Part A and Part B individually in storage vessels. Then the system 200 can subsequently meter each component from their respective storage vessel at a known flow rate into a mixing chamber. The system 200 can then mix Part A with Part B within the mixing chamber. In this example, the system 200 can include a static mixing head 210 with a series of crossing elements to create turbulence over which streams of Part A and Part B flow to induce mixing prior to a material forming process, such as slot-die coating.

In one variation, the system 200 can select the solvent 152 to react with the substrate 120 onto which the system 200 casts the viscous material 150. In this variation, the solvent 152 can be selected to dissolve a portion of the substrate 120 to improve adhesion (and promote cross-linking) between the substrate 120 and the thin layer 140 formed by casting the viscous material 150 onto the substrate 120. In this variation the solvent 152 can form a permanent bond between the thin layer 140 and the substrate 120, such that the substrate 120 cannot be easily removed from the thin layer 140. Alternatively, the solvent 152 can be non-reactive with the substrate 120. For example, the substrate 120 can form a peel-off backing (or "sticker backing") configured to peel off the thin layer 140 and expose a clean surface on the thin layer 140.

However, the system 200 can mix any other component to form the thin layer 140 in any other suitable way.

4. Casting

As shown in FIG. 1, Blocks S120 and S130 of the method S100 recite: advancing a substrate from a first roll across a surface continuously at a first speed in Block S120; and depositing the viscous material 150 through a deposition head at a first viscosity onto the substrate 120 in Block S130, the viscous material 150 flowing laterally across the substrate 120 to form a thin layer of substantially uniform thickness over the substrate over a period of time while the substrate advances along the surface. Generally, after mixing components of the thin layer 140 (e.g., prepolymer 151, solvent 152, catalyst 155, cross-linking agents, and/or chain extenders) into a viscous material 150 within a mixing head 210, the system 200 can cast or dispense the viscous material 150 through a slot-die coater 220 or nozzle onto a substrate 120 advancing on the conveying system beneath the slot-die coater 220.

In particular, after component parts of the thin layer 140 are combined within a static mixing head 210 to define a liquid viscous material 150, a material forming processor can dispense the viscous material 150 onto a substrate 120, on which the thin layer 140 can form. In this implementation, component materials of the viscous material 150 enter the slot-die coater 220. Clamping components of the slot-die coater can apply pressure to the viscous material 150 to conform with a particular shape. The clamping components then force the viscous material 150 to flow out from an interstitial between the clamping components onto a substrate 120 (or "web") translating below the slot-die coater 220.

In the foregoing implementation, the system 200 can include a conveyor and/or other component configured to translate a substrate 120 (e.g., PET and/or urethane) under the slot-die coater 220 to facilitate even and continuous distribution of viscous material 150 across the substrate 120 during dispensation of the viscous material 150 onto the substrate 120. The conveying system can be configured to unspool a roll of the substrate 120 and translate the substrate 120 over a surface, such as a mirror-finish or approximately flat and uniform plate. Alternatively, the conveyor can pull the substrate 120 over a surface, an air gap between a lower face of the substrate 120 and an upper face of the surface configured to minimize defects to a tactile surface 110 of the tactile layer 100 due to unevenness and/or non-uniform height of the upper face of the surface.

The conveyor can cooperate with the slot-die coater 220 to translate—or otherwise progress—the substrate 120 to pass over a surface (e.g., a mirror-finish plate) underneath outflowing viscous material 150 at a translation rate proportional to a flow rate of the viscous material 150 dispensed through the slot-die coater 220 onto the substrate 120. Therefore, the slot-die coater 220 can deposit sufficient viscous material 150 onto the substrate 120 to define a continuous layer of viscous material 150. Furthermore, the conveyor and the slot-die coater 220 can cooperate to determine thickness of the thin layer 140 (e.g., between twelve microns and thirty microns) as described below.

However, the system 200 can deposit the viscous material 150 onto the substrate 120 in any other suitable way.

5. Leveling

As shown in FIG. 2, Block S120 of the method recites: advancing a substrate from a first roll 230 across a surface continuously at a first speed in Block S120. Generally, the conveyor can continue to translate the substrate 120 and the deposited viscous material 150 over the surface (e.g., the mirror-finished plate described above) over a distance sufficient for the viscous material 150 to flow to define a uniform thickness film distributed across the substrate 120.

As described above, the system 200 can combine components of the viscous material 150 of a viscosity sufficient to flow to uniform thickness across the substrate 120—laterally and/or longitudinally—within a period (e.g., one minute) corresponding to a distance between the deposition head and point of entry into a curing device. In one implementation, the system 200 can access a known viscosity and/or measure a viscosity of the viscous material 150 prior to dispensation from the slot-die coater 220 onto the substrate 120. Based on the viscosity of the viscous material 150, the system 200 can define an approximate distance from dispensation of the viscous material 150 until the viscous material 150 levels across the substrate 120 to form a thin layer 140 of substantially uniform thickness. (The system 200 can also include a vibratory and/or agitation module to facilitate self-leveling of the viscous material 150 to form the thin layer 140.) For example, the system 200 can cast the viscous material 150 onto the substrate 120 (e.g., a continuous extruded elastomer film) translating a direction during deposition of the first viscous material 150. Following deposition of the viscous material 150, the first viscous material 150 can flow across the continuous film substrate 120, such as through capillary action between the substrate 120 and the viscous material 150 in order to form a thin layer 140 on top the substrate 120.

However, the system 200 can facilitate self-leveling of the viscous material 150 and uniform distribution of the viscous material 150 across the substrate 120 by any other suitable means.

6. Curing

Block S140 of the method S100 recites, at a distance from the deposition head of the viscous material 150 onto the substrate 120 corresponding to a duration of time for the viscous material 150 to flow laterally across the substrate to form the thin layer, heating the thin layer 140 to evaporate solvent 152 from the thin layer and to induce reaction between the catalyst 155 and the prepolymer 151 to cure the thin layer 140 in Block S140. Generally, the system 200 can implement Block S140 to heat the thin layer 140 in order to drive off excess solvent 152 from the thin layer 140 and, therefore, facilitate curing of the thin layer 140 and formation of polymer cross-links desired for applications of the tactile layer 100.

In particular, the conveyor can translate the substrate 120 and the thin layer 140 of viscous material 150 toward a curing device, such as an oven 252, an ultraviolet-curing oven, etc. However, the curing device can include any device capable of applying heat, ultraviolet radiation, a curing solution, and/or any combination thereof to cure the thin layer 140 to an initial cured state. The system 200 can access properties of the viscous material 150, such as cure time and curing parameters, and desired curing level upon exit from the curing device (i.e., from a local database and/or remote lookup table) to calculate a duration and other curing parameters to output from the curing device to achieve a desired curing level (e.g. 50% cured, 75% cured, 100% cured). For example, the system 200 can calculate the desired curing level of the thin layer 140 as 80% cured upon exiting the curing device. In this example, the system 200 can perform additional processes and/or apply additional coatings following initial curing within the device—further down the manufacturing line. After these additional coatings and/or materials or other processes are applied to the thin layer 140, the system 200 can fully cure the thin layer 140 (and additional coatings) to a final cured state (e.g., 100% cured).

In one implementation, the curing device can output conditions configured to evaporate approximately 90-95% of the solvent 152 and, therefore facilitate curing of the thin layer 140. By removing the solvent 152 to this extent, the system 200 can induce reaction of components in the thin layer 140 and promote cross-linking between the polymers of the thin layer 140. Additionally, removal of the solvent 152 also prevents bubble formation in the thin layer 140, thereby mitigating optical defects and/or aberrations formed at uncured regions of the thin layer 140, regions of unreacted prepolymer 151 and/or catalyst 155, and/or regions of the thin layer 140 of non-uniform thickness.

In one example, the system 200 can include a curing oven 252. The curing oven 252 can output heat over a time window and at a target temperature (e.g., 100 degrees Celsius) to evaporate solvent 152 off the thin layer 140 and, therefore, facilitate reaction between the prepolymer 151 and the curing agents. The oven can heat the tactile layer to the temperature over a predetermined duration in order to yield a desired level of tackiness (or percent of uncured viscous material iso) of the thin layer 140 when the thin layer 140 exits the oven. In this example, the conveyor can cooperate with the curing oven 252 to progress the tactile layer 100 through the oven 252 during a time window corresponding to the duration defined for the tactile layer. In this example, the thin layer can remain with the oven 252 for a longer duration to lessen tackiness of the thin layer 140 when the thin layer 140 exits the oven 252. Alternatively, the thin layer 140 can remain within the oven 252 for a shorter duration to increase tackiness of the thin layer 140 when the thin layer 140 exits the oven 252. Therefore, the conveyor and the oven 252 can cooperate to sufficiently cure the thin layer 140 to yield: a desired level of tackiness corresponding to a desired material performance and a sufficient curing level such that the system 200 can spool the tactile layer 100 without sticking to itself when rolled.

In one variation, the system 200 can define a final curing level for the thin layer 140 upon completion of all processes performed by the system 200 (e.g., deposition, leveling, initial curing, and rolling onto a spool). In this variation, the thin layer 140 can be partially uncured at a time when the system 200 spools the tactile layer 100—which includes the thin layer 140 and the substrate 120—onto a roll. The thin layer 140 can continue to cure on the roll after spooling.

However, the system 200 can drive off solvent 152, induce polymerization of the prepolymer 151 and cross-linking between polymers, and/or cure the thin layer 140 in any other suitable way.

7. Multiple Layers

Figure 6:
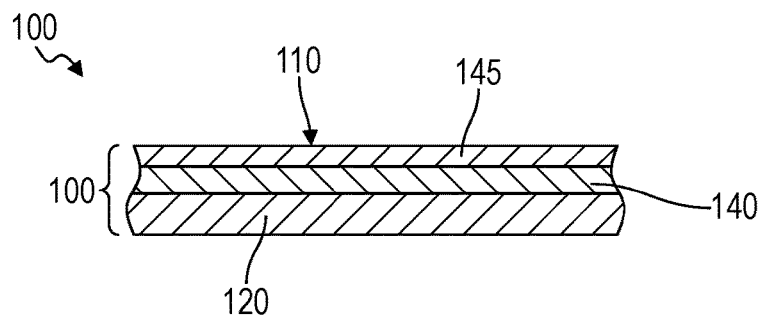
FIG. 6 is a schematic representation of a variation of the tactile layer.

In one variation shown in FIG. 6, the system 200 can repeat the foregoing techniques and methods to deposit a second layer of the viscous material 150 onto a first layer 140 of the viscous material 150. In this variation, the system 200 can tune chemical composition and curing parameters for each layer to control adhesion (and polymer cross-linking) between layers and define an elastomer film that is resistant to impacts, pliable, and optically clear. In particular, the system 200 can first deposit a first viscous material 150 of prepolymer 151, curing agents, and solvent 152 onto a substrate 120 (e.g., a continuous elastomer film unspooled from a roll 230) and cure the first viscous material 150 to define a first thin layer 140 on top of the substrate 120 as described above. After exiting the curing device, the system 200 can translate the first thin layer 140 and the substrate 120 under a slot-die coater 220, which can deposit a second thin layer 145 of the viscous material 150 (or of another viscous material 150 of prepolymer 151) onto the first layer.

In one implementation, the system 200 can deposit a viscous material 150 including a solvent 152 configured to dissolve a top portion of the first thin layer 140 when the slot-die coater 220 deposits the viscous material 150 onto the first thin layer 140 to form the second layer. In this implementation, the solvent 152 of the viscous material 150 deposited onto the first thin layer 140 can facilitate adhesion and/or cross-linking of polymers between layers of the tactile layer 100. Therefore, the first layer can be physically and chemically cross-linked with the second layer.

7.1 Relaxation Time

Figure 7:
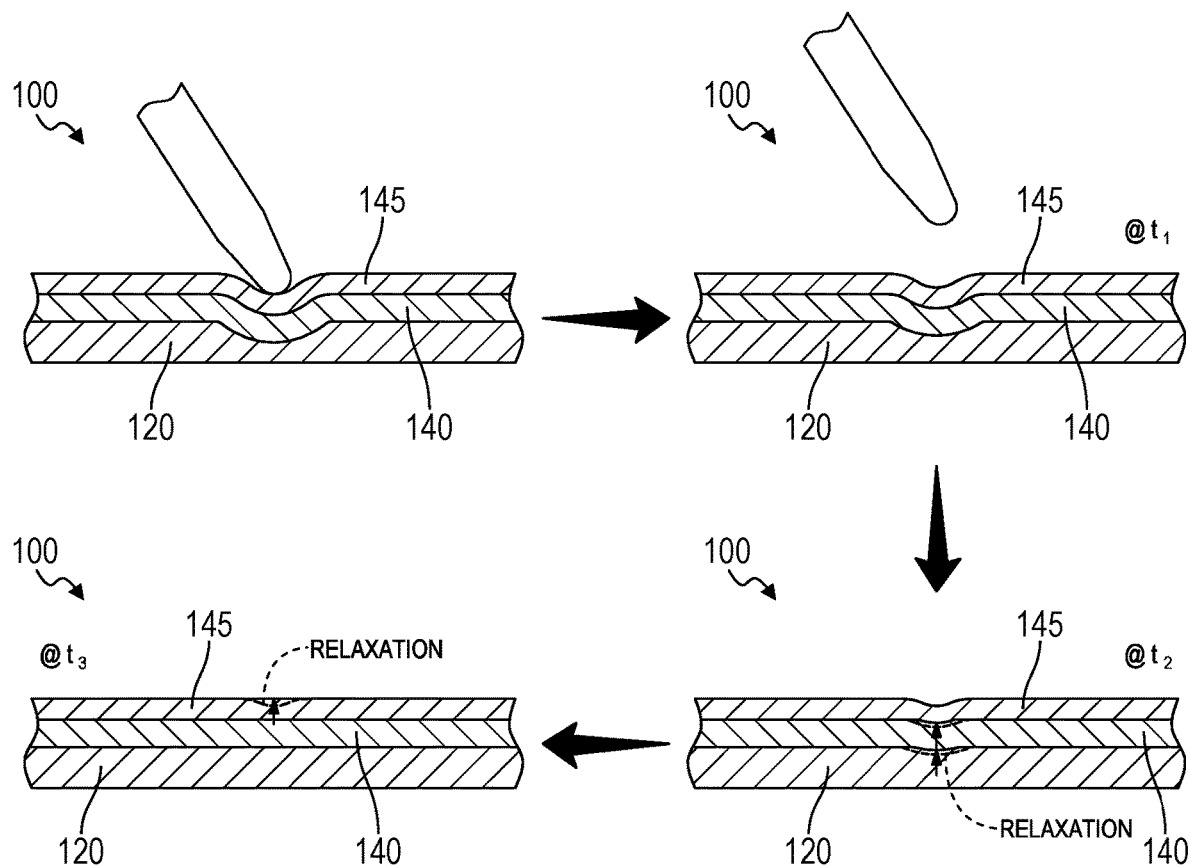
FIG. 7 is a flowchart representation of a variation of the tactile layer.

In another implementation shown in FIG. 7, each layer of the tactile layer can cooperate to yield particular material properties, such as resistance to impact and permanent deformation. Generally, each layer of the tactile layer can exhibit a relaxation time defined as a duration following deformation resulting from an impact to the layer until the layer returns to an equilibrium state (e.g., planar and/or pre-deformation topography). Large differences in relaxation time between layers can result in embrittlement and fatigue of layers with slower relaxation times, eventually yielding an optical aberration. Therefore, each layer of the tactile layer 100 can exhibit closely matched (or identical) relaxation times to avoid fatigue of other layers of the tactile layer.

In this implementation, the system 200 can cast and cure a first viscous material 150 to form a first layer—which includes particular cross-linking patterns controlled by process parameters output by the system 200—exhibiting a first relaxation time. In this implementation, the system 200 can tune relaxation time of each layer by tuning process parameters—such as cure time, cure temperature, and input components (e.g., types of prepolymers 151, solvents, catalysts, cross-linking agents, and/or chain extenders)—that affect extent of polymer cross-linking, directionality of polymer cross-linking, and/or other material properties of each layer that influence relaxation time and elasticity of the thin layer 140.

In one example, a rheometer can apply a stress (e.g., shear and/or rotational) to the tactile surface of the first layer. The relaxation time can be defined as a duration extending from application of the stress to the tactile surface 110 of the tactile layer until the tactile surface 110 returns to a pre-stress state.

Furthermore, in this implementation, the system 200 can cast and cure a second viscous material 150 to form a second layer on top of the first layer. The second layer can exhibit a second relaxation time. In this implementation, the second layer can be configured to exhibit the second relaxation time falling within a threshold offset of the relaxation time of the first layer (or relaxation time of another adjacent layer, such as the substrate 120). For example, the first layer and the second layer can exhibit identical (or similar) relaxation times. In this example, in response to an impact applied to a tactile surface 110 of the second layer (e.g., direct drop on the tactile surface 110), the first layer and the second layer morph into a deformed state corresponding to an impact-applying object (e.g., a rock). After removal of the impact-applying object from the tactile surface 110, the first layer and the second layer recover from the impact within the relaxation time.

In another example shown in FIG. 7, the first thin layer 140 can exhibit a relaxation time distinct from and less than the relaxation time of the second layer. In this example, in response to an impact applied to the tactile surface 110 of the second layer, the first layer and the second layer morph into a deformed state corresponding to an impact-applying object. After removal of the impact-applying object from the tactile surface 110, the first layer can recover from the impact to a pre-deformation state quicker than the second layer recovers from the impact to a pre-deformation state. In this example, the first layer can cooperate with the second layer to push the second layer back to the pre-deformation state (i.e., a planar surface) and quickly return the tactile surface 110 to an equilibrium state as a result of the first layer's quicker recovery time.

7.2 Hard Layer

In one variation, the system 200 can deposit, adhere, apply a cover sheet (e.g., PET layer) on top of the first layer opposite the substrate 120 to laminate an upper surface of the thin layer 140 and protect the tactile layer 100 from particulate contamination and/or defects.

In one implementation, the system 200 can apply the cover sheet to dictate surface texture and/or roughness of the tactile surface 110 of the thin layer 140. In particular, the system 200 can apply a textured polymer cover sheet that depresses into the tactile surface 110 of the tactile layer leaving depressions conforming with the textured polymer cover sheet on the tactile layer. this implementation, the system 200 can control a curing level after exiting the curing device to influence an extent the textured cover sheet imprints onto the thin layer 140. As described above, the system 200 can also control adhesion between the tactile layer and the cover sheet (i.e., how strongly or weakly the thin layer 140 is bonded to the cover sheet). For example, the system 200 can tune a cure time (or schedule) of the tactile layer to reduce tackiness at a time in which the cover sheet is applied to the tactile layer, such that the cover sheet can be readily removed. However, the system 200 can also tune the cure time of the tactile layer to increase tackiness and, therefore, increase adhesion between the tactile layer and the cover sheet after application of the cover sheet to the tactile layer.

In another variation, the system 200 can apply an additional protective layer (s) and/or film layer to the tactile layer. The system 200 can place, grow, and/or deposit the film layer on either side of the tactile layer 100. In this variation, the film layer can form an anti-scratch coating and/or a self-healing coating. For example, the film layer can exhibit characteristics including optically clarity, and/or durability such that the material can be compressed and stretched (e.g., up to 150%-200% of original size). The film layer can also exhibit ultraviolet absorbency, chemical resistance, hydrophobicity, and/or oleophobicity (or philicity). The combination of the tactile layer 100 and the film layer can also be coated with a PET release liner 180.

The additional protective layer 160 can include an anti-scratch layer, a protective hard coating, and/or a protective coating that self-heals after impact and/or yields a soft, elastic surface, such as to mimic writing application. In this variation, the system 200 can apply the additional protective layer 160 to the thin layer 140. For example, the system 200 can spray and/or apply a hard coating onto the tactile surface 110 of the tactile layer 100 in line with other processes of the method S100. In this example, the system 200 can apply the hard coating to define a hard touch surface configured to distribute impacts across the hard touch surface. Furthermore, the thin layer 140 (located between the hard coating and the substrate 120) can be configured to dampen impact to the substrate 120. In another example, the system 200 can apply the anti-scratch layer to a liner (e.g., a PET layer) and later adhere the anti-scratch layer to the tactile surface 110 of the tactile layer prior to spooling the tactile layer.

The system 200 can adhere or bond the anti-scratch layer to the thin layer 140 due of the interaction of the polymer chains between the tactile layer and the anti-scratch layer. Additionally or alternatively, the system 200 can apply a surface treatment, such as corona discharge or plasma treatment, to the tactile surface 110 of the tactile layer and/or to the anti-scratch layer to induce a hydroxyl effect that promotes covalent bonding between the anti-scratch layer and the tactile surface no. Therefore, the tactile layer 100 can be affixed to the film layer through chemical bonding (e.g., covalent bonds between molecules of film layer and tactile layer 100), mechanical bonding (e.g., using pressure in a press fitting, with a screw) thermal bonding (e.g., by applying heat to one or both surfaces forming the bonding interface), and/or with an adhesive (e.g., glue).

However, the system 200 can apply any other coating and/or layer to the thin layer 140 to yield any other desired property (e.g., optical, mechanical, and/or chemical) in any other suitable way.

8. Roll-to-Roll

In another variation, the system 200 can spool the tactile layer 100, which includes the substrate 120, the thin layer 140, and any additional coatings or applied layers, into a final roll 232 for transport. Generally, in this variation, the system 200 can spool the tactile layer 100 to reduce manufacturing cycle time and increase throughput.

As described above, the system 200 can control on-line curing such that when the tactile layer 100 is spooled onto the final roll 232, the thin layer 140 remains partially uncured. In this variation, the system 200 can dictate a final curing level of the thin layer 140 upon commencement of spooling that is sufficient to prevent formation of defects to the tactile surface 110 and enables the thin layer 140 to continue to cure offline on the final roll 232. In an example described above, once the cover sheet is laminated onto the surface of the tactile layer 100 and rolled, the tactile layer 100 can further cure to a final cured stated. The system 200 can heat the final roll in a curing device as described above to cure the thin layer after spooling the tactile layer.

9. Composition of the Tactile Layer

Figure 4:
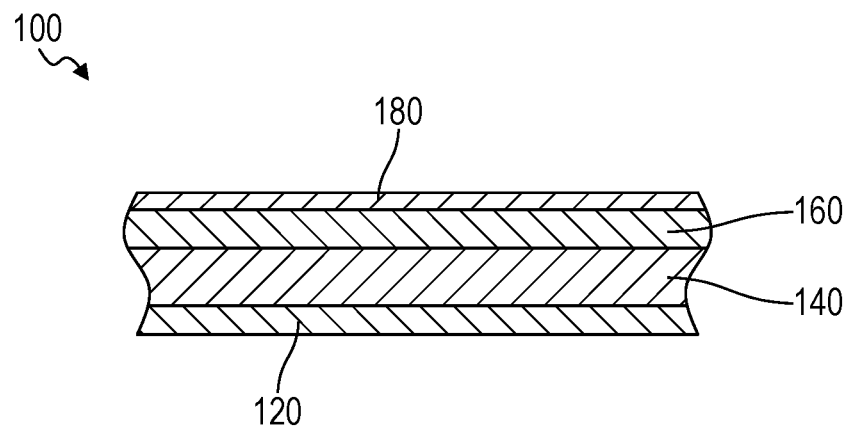
FIG. 4 is a schematic representation of a tactile layer.

As described above, the method S100 can be implemented to manufacture and process a tactile layer 100 (or film) that is durable and optically-clear, such as for application over a touch-sensitive display. As shown in FIG. 4, a tactile layer 100 can exhibit properties such as high elastic recovery, durability, optical clarity, and scratch resistance resulting from chemical composition of the tactile layer and process parameters implemented by the system 200 in Blocks of the method S100. In one implementation, the system 200 can implement Blocks of the method S100 to form the thin layer 140 with a thickness of 5-100 microns of an elastic material. Additionally, the system 200 can execute Blocks of the method S100 to coat the thin layer 140 with an anti-scratch coating to improve durability of the tactile layer 100.

In one implementation, a primary base component of the thin layer 140 is a prepolymer 151 at an intermediate stage of polymerization. While in one implementation, the prepolymer 151 includes TDI-terminated polyester prepolymer 151, other prepolymers 151 can be mixed in combination with or in lieu of TDI-terminated polyester prepolymer 151. These additional or alternative prepolymers 151 include: isocyanate containing prepolymers 151 having low molecular weight; or isocyanate-containing polymers that contain aliphatic, aromatic, or isocyanate groups. The system 200 can also implement other prepolymers 151, such as prepolymers 151 with low concentrations of free isocyanates ("low free"). However, both conventional and "low free" materials can be utilized. Prepolymer backbones can include polyester, polyether, polycarbonate, polyacrylic, or mixtures thereof. (The prepolymer 151 component can be an isocyanate-containing compound that will slowly react with water and other alcohols. The system 200 can therefore pump a nitrogen gas blanket over the prepolymer 151 and other solids in the viscous material 150 to dry them prior to mixing with other components of the thin layer 140.)

The viscous material 150 applied to the substrate 120 can also include a chain extender 153, such as an aromatic diamine curative for polyurethane. However, one or more other chain extenders can be applied to the viscous material 150 in combination with or in lieu of the aromatic diamine curative for polyurethane, including classes of materials with small molecules and two isocyanate reactive end groups that include aliphatic amines, aromatic amines, and hydroxyls. In one implementation, the viscous material 150 includes a combination of chain extenders or curatives to balance processing characteristics, such as pot life and tack time, and material performance characteristics, such as optical properties, UV resistance properties, elastic recovery, scratch resistance, and/or compressibility. Examples of chain extenders/curatives that can be used in the viscous materials of chain extenders include: ethylene glycol, diethylene glycol, 1,3 propanediol, 1,4 butanediol, 1,5 pentanediol, 1,6 hexanediol, aromatic diamine curative for polyurethane 90, aromatic diamine curative for polyurethane of various molecular weights (e.g., 100, or 300), polyoxypropylenediamine of various molecular weights (e.g., 230, 400, or 2000), Hydroquinone bis(2-Hydroxyethyl) or "HQEE", and/or ethoxylated HQEE.

The viscous material 150 also includes a cross-linking agent 154, such as DiTMP. However, one or more other cross-linking agents can be mixed with DiTMP. For example, isocyanate reactive end groups include aliphatic amines, aromatic amines, and hydroxyls. In one implementation, the viscous material 150 can contain a combination of cross-linking agents and chain extenders to balance processing characteristics, such as pot life and tack time, and material performance characteristics such as optical properties, UV resistance properties, elastic recovery, scratch resistance, and indentation/compressibility. Examples of these cross-linking agents include TMP, DiTMP, Ethoxylated TMP, Ethyoxylated DiTMP.

The viscous material also includes a catalyst (e.g., Dibutyltin dilaurate). However, other catalysts that exhibit snap cure capabilities include organo-metallic containing compounds with one or more of the following ligands: Sn, Ti, Zn, Hg, and/or Bi. Alternatively, catalysts can include an organic catalytic moiety, such as a tertiary amine (e.g., stannous octoate or dibutyltin dilaurate)

An appropriate snap-cure catalyst that is compatible with Part A and Part B can be selected such that Part A and Part B do not begin to react upon mixing in the static mixing head. Therefore, the system can dispense the mixture through the mixing head and slot-die, and the mixture can self-level before curing begins. In this implementation, the system can: 1) tune the non-catalyzed reactivity of the Part B mixture with isocyanate groups in Part A to minimize reaction and associated enthalpy of reaction at room temperature; 2) dilute the viscous material with solvent to reduce concentration of isocyanate and isocyanate-reactive groups; and/or 3) select a snap-cure catalyst that is inactive at temperatures below the drying/curing temperature of the viscous material.

In this implementation, the system can combine a prepolymer, such as a TDI-terminated polyester prepolymer, a chain extender, such as an aromatic diamine curative for polyurethane, and a cross-linker, such as DiTMP to form the mixture that can be cast according to the method S100 for the elastomer layer 14. Once base components of the elastomer are thus selected, the system can identify an appropriate amount—by weight or by volume—of each component to achieve an optimal composition mixture for forming a film layer with the appropriate optical properties, durability properties, and mechanical properties.

Once the base components of the elastomer are identified, the system 200 can identify an appropriate amount (by weight or by volume) of each component to achieve an optimal composition viscous material 150 for forming a film layer with the appropriate optical properties, durability properties, and mechanical properties.

The solvent can include an OH terminated chain extender, such as including diol chain extenders (e.g., butanediol or "BDO" or hydroquinone ether or "HQEE"). In the mixture of base components described above, a portion of the aromatic diamine curative for polyurethane component of the base components can be substituted with solvent since aromatic diamine curative may also function as a chain extender for polyurethane.

TDI-terminated polyester prepolymer 151 typically forms 70%-86% of the composition of the tactile layer 100 whereas aromatic diamine curative for polyurethane, DiTMP, catalyst 155, and solvent 152 form 2-2.9%, 1.5-2%, 0.1-0.2%, and 9-33%, respectively, of the tactile layer 100. In this implementation, the weighted percentage of the components can vary to achieve specific performances of the tactile layer 100 described below. Furthermore, the composition can also enhance or lengthen shelf-life stability of Part A and Part B (as described above) in viscous materials with solvent 152. For example, the system can increase a volume of cross-linking agent within the viscous material to improve durability of the thin layer.

In another implementation, the system 200 can replace or substitute a portion or all of the aromatic diamine curative for polyurethane chain extender 153 with an OH terminated chain extender 153, such as BDO and/or HQEE, to increase pot life for the material composition. Thus, the system 200 can vary a volume and a type of the OH terminated chain extender 153 substituted into the material composition according to an amount of pot life desired for manufacturing a film using the material composition. For example, by substituting at least 50% of the aromatic diamine curative for polyurethane chain extender 153 with 50% BDO or 50% HQEE, the system 200 can extend the pot life by one minute (1 min.) or eight minutes (8 min.), respectively. In another example, by replacing the aromatic diamine curative for polyurethane component with a diol chain extender 153, such as BDO or HQEE, the system 200 can extend the pot life of the material composition by thirty minutes (30 min.) or by more than sixty minutes (60 min.).

The system 200 can then add the chain extender 153 to the prepolymer 151 component at one or more times during manufacture. For example, the system 200 can add the chain extender 153 at the outset of the mixing of the base components of the viscous material 150 in order to aid in the dissolution of one or more of the base components, including the prepolymer 151. Alternatively or additionally, the system 200 can add the chain extender 153 composition continuously throughout one or more aspects of manufacture of the material to control the dissolution and viscous material 150 of the base components. Additionally or alternatively, amounts of the chain extender 153 can be added at a first time (e.g., before mixing for purposes of dissolving the prepolymer 151, etc.) and at a second time to enhance the dissolution of the composition materials prior to a slot-die coating.

9.1 Tactile Layer Properties

The system can execute various Blocks of the method S100 to achieve certain reflectivity, light transmission, haze, clarity, gloss, and/or other optical properties of the tactile layer 110. For example, the tactile layer 110 can exhibit transmission of light to greater than 90% (e.g., 93%), limit haze to less than or equal to 1%, increase clarity up to or greater than 99%, improve gloss to greater than seventy gloss units, etc.

Additionally or alternatively, processes and/or composition of the mixture can be tuned to enhance optical properties of the tactile layer 110 for specific applications in which anti-glare properties (e.g., outdoor use, etc.) are desired. For example, the system can control clarity or haze of the elastomer layer 14 by controlling cure time, cure temperature, and manufacturing cleanliness (i.e., to prevent contaminants) to alter a haze value to approximately 8% haze. In this example, by improving the optical properties of the material to increase haze, the system can also control (and reduce) glare from the tactile layer 110. Furthermore, the system can tune processing parameters to control and optimize transmission, haze, clarity, gloss, and sparkle of tactile layer 110 without substantially modifying the tactile layer 110's enhanced optical, durability, and other mechanical properties.

10. Example Applications

Figure 5:
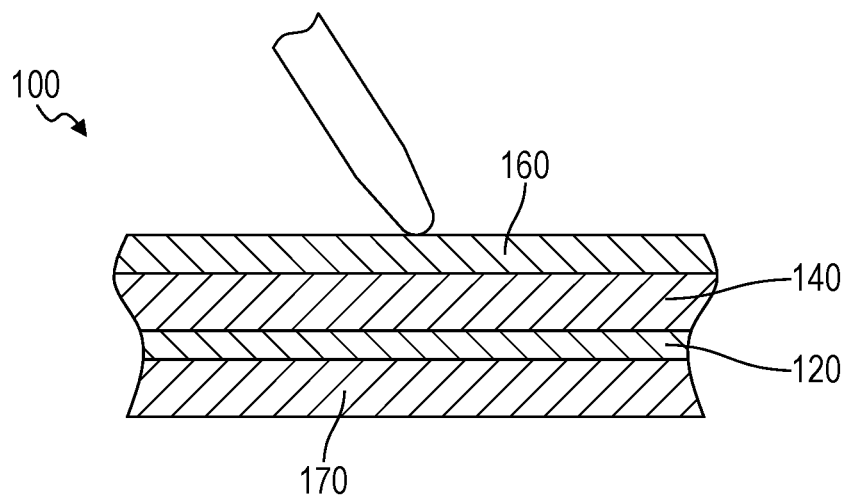
FIG. 5 is a schematic representation of an example application in of the tactile layer.

The system 200 can implement Blocks of the method S100 to form the tactile layer 100 in a variety of different shapes for use in various applications including stylus applications, as shown in FIG. 5. For example, the tactile layer 100 can be arranged over a touch-sensor to define a touch-sensitive surface. In this application, the tactile layer 100 together with the film layer form a writing surface configured to yield a similar writing sensation to that of writing with a pen on paper. Other applications can be identified for which optical clarity and scratch resistance and/or flexibility attributes are required. Thus, the tactile layer 100 could be used as packing material, labeling material, or lighting casing. In other applications, the tactile layer 100 can be tuned to exhibit optical properties, such as optical clarity or opacity. However, the system 200 can mask the tactile layer 100 to maintain desired optical clarity and related properties in any other suitable way.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for directly casting an elastomer film onto a substrate comprising:
    combining a first prepolymer, a first solvent, and a first chain extender to define a first material;
    advancing a substrate from a first roll across a surface continuously at a first speed;
    depositing the first material onto the substrate, the first material flowing laterally across the substrate while the substrate advances along the surface;
    after self-levelling of the first material across the substrate to form a first layer of substantially uniform thickness over the substrate, heating the first layer to induce a first reaction between the first chain extender and the first prepolymer and to evaporate the first solvent to cure the first layer exhibiting a first relaxation time in response to impacts;
    combining a second prepolymer, a second solvent, and a second chain extender to define a second material, the first layer being soluble in the second solvent;
    advancing the substrate and the first layer across the surface continuously at a second speed proportional to a flow rate of the second material;
    depositing the second material onto the first layer opposite the substrate, the second material flowing laterally across the substrate first layer while the substrate and the first layer advance along the surface; and
    after self-levelling of the second material across the first layer to form a second layer of substantially uniform thickness over the first layer, heating the second layer to induce a second reaction between the second chain extender and the second prepolymer and to evaporate the second solvent to cure the second layer:
        comprising physically and chemically cross-linked polymer chains; and
        exhibiting a second relaxation time distinct from the first relaxation time and configured to recover from impacts displacing the second layer.

2. The method of claim 1, wherein combining the first prepolymer, the first solvent, and the first chain extender to define the first material comprises mixing a first solution and a second solution, the first solution comprising the first prepolymer and the first solvent, the second solution comprising a catalyst, a cross-linking agent, and the first chain extender configured to promote polymerization of the first prepolymer and cross-linking of polymer chains to form physically and chemically cross-linked polymer chains that define the first layer.

3. The method of claim 2, wherein mixing the first solution and the second solution comprises:
    mixing the first prepolymer comprising a TDI-terminated polyester prepolymer and the first solvent comprising methyl ethyl ketone to define the first solution; and
    mixing the catalyst comprising dibutyltin dilaurate, the first chain extender comprising an aromatic diamine curative for polyurethane, and the cross-linking agent comprising ditrimethylolpropane to define the second solution.

4. The method of claim 1, wherein depositing the first material onto the substrate comprises depositing the first material onto the substrate translating a first direction during deposition of the first material, the first material distributing across the substrate to form the first layer of substantially uniform thickness extending contiguously across the substrate.

5. The method of claim 4, wherein depositing the first material onto the substrate comprises depositing the first material onto the substrate comprising polyethylene terephthalate removable from the first layer after curing.

6. The method of claim 1, wherein heating the first layer to evaporate the first solvent comprises heating the first layer for a first duration to cure the first layer to a first curing level less than a final curing level.

7. The method of claim 1:
    wherein combining the first prepolymer, the first solvent, and the first chain extender comprises mixing the first prepolymer, the first solvent, and the first chain extender within a mixing head;
    wherein advancing the substrate across the surface comprises progressing the substrate over a mirror-finish surface toward an oven;
    wherein depositing the first material onto the substrate comprises dispensing the first material onto the substrate translating over a mirror-finish surface through a slot die coater; and
    wherein heating the first material comprises translating the first layer and the substrate through the oven for a predetermined duration, the oven configured to heat the first layer and the substrate to a target temperature, the predetermined duration defined by a cure time and a target cure level upon exiting the oven.

8. A method for directly casting an elastomer film onto a substrate comprising:
    combining a first prepolymer, a first solvent, and a first chain extender to define a first material;
    while advancing a substrate across a surface:
        depositing the first material onto the substrate, the first material flowing laterally across the substrate to form a first layer of substantially uniform thickness over the substrate; and
        heating the first layer to:
            induce a first reaction between the first chain extender and the first prepolymer;
            evaporate the first solvent; and
            form a cured first layer exhibiting a first relaxation time;
    combining a second prepolymer, a second chain extender, and a second solvent to define a second material; and
    while advancing the substrate and the cured first layer across the surface:
        depositing the second material onto the cured first layer opposite the substrate, the second material:
            flowing laterally across the cured first layer to form a second layer of substantially uniform thickness over the cured first layer; and
            dissolving a top portion of the cured first layer due to solubility of the cured first layer in the second solvent; and heating the cured first layer and the second layer to:
induce a second reaction between the second chain extender and the second prepolymer;
evaporate the second solvent; and
form a cured second layer, the cured second layer exhibiting a second relaxation time greater than the first relaxation time.

9. A method for directly casting an elastomer film onto a substrate comprising:
combining a first prepolymer, a first solvent, and a first chain extender to define a first material;
while advancing a substrate across a surface:
depositing the first material onto the substrate, the first material flowing across the substrate to form a first layer over the substrate; and
heating the first layer to form a cured first layer over the substrate exhibiting a first relaxation time;
combining a second prepolymer, a second chain extender, and a second solvent to define a second material; and
while advancing the substrate and the cured first layer across the surface:
depositing the second material onto the cured first layer opposite the substrate, the second material flowing across the cured first layer to form a second layer over the cured first layer; and
heating the cured first layer and the second layer to form a cured second layer, the cured second layer exhibiting a second relaxation time greater than the first relaxation time.

10. The method of claim 9, wherein combining the first prepolymer, the first solvent, and the first chain extender to define the first material comprises mixing a first solution and a second solution, the first solution comprising the first prepolymer and the first solvent, the second solution comprising a catalyst, a cross-linking agent, and the first chain extender.

11. The method of claim 10:
wherein heating the first layer to form the cured first layer comprises heating the first layer to a first cure temperature to form the cured first layer; and
wherein mixing the first solution and the second solution comprises mixing the first solution and the second solution, the second solution comprising the cross-linking agent, the first chain extender, and a snap-cure catalyst inactive in catalyzing polymerization of the first prepolymer below the first cure temperature.

12. The method of claim 10, further comprising:
measuring a first viscosity of the first solution;
measuring a second viscosity of the second solution; and
in response to a deviation of the second viscosity from the first viscosity exceeding a threshold deviation of twenty percent, adding solvent to the second solution.

13. The method of claim 9, wherein depositing the first material onto the substrate comprises dissolving a top portion of the substrate in the first solvent of the first material.

14. The method of claim 9:
wherein heating the first layer to form the cured first layer exhibiting the first relaxation time comprises heating the first layer at a first cure temperature to form the cured first layer exhibiting the first relaxation time correlated with the first cure temperature; and
wherein heating the cured first layer and the second layer to form the cured second layer comprises heating the cured first layer and the second layer at a second cure temperature to form the cured second layer, the cured second layer exhibiting the second relaxation time longer than the first relaxation time and correlated with the second cure temperature.

15. The method of claim 9, further comprising depositing an anti-scratch coating over the cured second layer.

16. The method of claim 9, further comprising depositing a self-healing protective coating over the cured second layer.

17. The method of claim 9, further comprising, prior to depositing the first material onto the substrate, heating the first material to reduce a viscosity of the first material to less than 3500 centipoise.

18. The method of claim 17, further comprising, prior to depositing the second material onto the cured first layer opposite the substrate, heating the second material to reduce a viscosity of the second material to less than 3500 centipoise.

* * * * *